Patented May 20, 1952

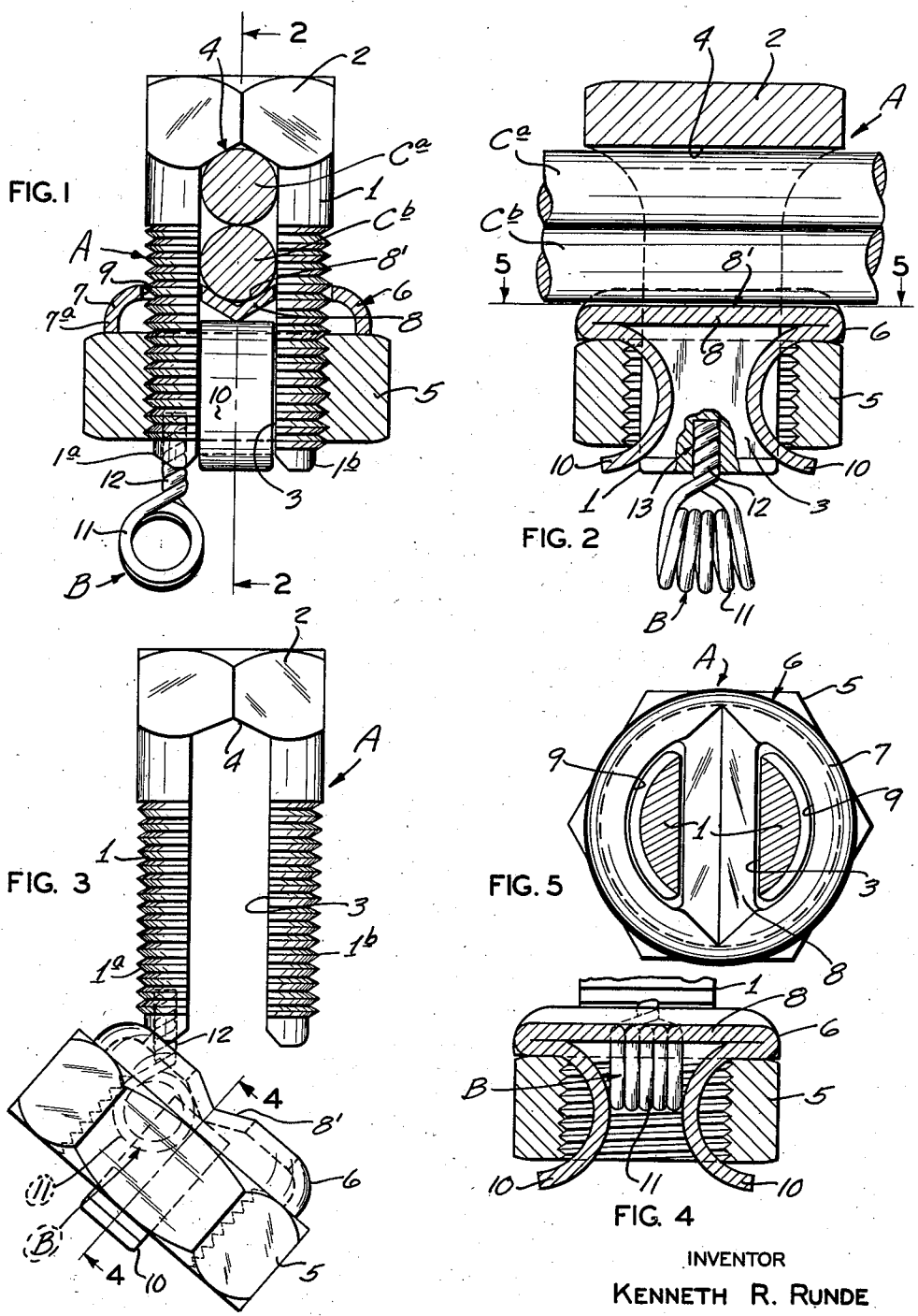
INVENTOR
KENNETH R. RUNDE

2,597,037

UNITED STATES PATENT OFFICE 2,597,037

ELECTRICAL CONNECTOR

Kenneth R. Runde, Lemay, Mo., assignor to James R. Kearney Corporation, St. Louis, Mo., a corporation of Missouri Application February 8, 1947, Serial No. 727,342

4 Claims. (Cl. 24—125)

This invention relates generally to electrical connectors of the split bolt type which are adapted particularly for use in the construction, maintenance and repair of electrical distribution systems, and more specifically to connectors of this type which are provided with nut retainers which serve to retain the nut and washer assemblies of the connectors in related association with the bolts thereof when said nut and washer assemblies are dismounted from their normal positions on said bolts, the predominant object of the invention being to provide an electrical connector of the type referred to which is provided with an improved nut retaining means which is capable of performing its intended function in an improved and highly efficient manner.

Fig. 1 is a view partly in elevation and partly in vertical section of the improved connector of the present invention, a pair of conductors with which the connector is shown in association being illustrated in section.

Fig. 2 is a vertical sectional view of the improved connector taken on line 2—2 of Fig. 1.

Fig. 3 is a side elevational view of the improved connector of the present invention showing the nut and washer assembly dismounted from the bolt of the connector but retained in related association with said connector bolt.

Fig. 4 is a cross section taken on line 4—4 of Fig. 3.

Fig. 5 is a horizontal section on line 5—5 of Fig. 2.

In the drawing, wherein is shown for purposes of illustration, merely, one embodiment of the invention, A designates the improved connector generally. The connector A includes a bolt 1 which provides the body portion of the connector, said bolt having a head portion 2 and being provided with a longitudinal, medial slot 3 which extends inwardly from the outer end of the bolt shank to the under or inner side of the bolt head. The slot terminates at the headed end of the bolt in a groove 4 which traverses the under side of the bolt head and provides a conductor seat.

Mounted on the split, screwthreaded shank portion of the bolt 1 is a nut 5 which has permanently associated therewith a washer 6, the connection between the washer and the nut being such as to permit the nut to rotate relative to the washer. The washer preferably comprises an annular portion 7 which surrounds the spaced shank portions 1a and 1b of the bolt, and said annular portion 7 is turned downwardly to provide a skirt portion 7a which bears edgewise upon the upper face of the nut 5. The washer 6 includes also a bridge portion 8 which, by preference, is longitudinally grooved to provide a conductor seat 8', and the presence of this bridge portion provides the washer with segmental openings 9 through which the correspondingly shaped shank portions 1a and 1b of the bolt 1 pass. The washer 6 is provided with a pair of fingers 10 which are extended from the skirt portion of the washer at points adjacent to the opposite ends of the bridge portion 8, these fingers being projected initially inwardly and then downwardly and outwardly through the bore of the nut. The free ends of the fingers 10 underlie the lower face of the nut and maintain the nut and washer in such assembled relation as to permit the nut to rotate about the screwthreaded bolt shank while the washer moves in a non-rotatable manner longitudinally of said bolt shank. Portions of the bridge portion 8 and the fingers 10 of the washer 6 are disposed in the bolt slot when the nut and washer assembly is mounted on the bolt shank and said washer parts are of substantially the same width as said bolt slot. Accordingly, said portions of said bridge portion and said fingers serve as spacers which prevent the shank portions 1a and 1b from being drawn toward each other when the nut is drawn up tight on the bolt.

The nut retainer of the connector of the present invention is designated generally by the reference character B and it includes a coil 11 of wire, or other suitable resilient material, the opposite end portions of the length of wire from which the coil 11 is formed being extended toward each other and twisted together to provide a stem 12, as is shown in Fig. 2. The nut retainer B is secured to the shank portion 1a of the bolt 1 of the connector, preferably, by drilling a hole 13 in said shank portion at the bottom thereof and forcing the stem 12 of the nut retainer into said hole, the relative diameters of the hole 13 and the stem 12 being such that a drive fit will be obtained between said stem and the wall of said hole which will cause the nut retainer to be securely anchored in place with respect to the shank portion 1a of the connector bolt.

It is important to note that the action of drawing together and twisting the opposite end portions of the length of wire of which the coil 11 is formed to produce the stem 12 of the nut retainer B, compresses the upper portion of the coil 11 so that said coil is of slightly less length at its top than at its bottom. This arrangement is shown to good advantage in Fig. 2 and constitutes an important feature of the present invention. Also, it is to be noted that the major axis of the coil 11 of the nut retainer B, which extends longitudinally of said coil, is disposed at an angle relative to the major axis of the bolt 1 that extends longitudinally of said bolt.

When the improved connector of the present invention is to be applied to a conductor, the nut and washer assembly is unscrewed from the bolt 1 of the connector whereupon the nut and washer assembly will assume the approximate position in which said assembly is illustrated in Fig. 3, the coil 11 of the nut retainer retaining the nut and washer assembly in connected relation with respect to the connector bolt because of the fact that said coil is too large to pass through the segmental openings 9 of the washer 6 through which the stem 12 of the nut retainer extends. With the nut and washer assembly disposed in the position in which it is illustrated in Fig. 3, a very substantial passageway is provided between the lower end of the shank portion 1b of the connector bolt 1 and the washer 6 which leads to the lower end of the bolt slot 3. Therefore the connector bolt may be freely and conveniently passed onto a conductor, such as the conductor Ca, and moved downwardly with respect thereto so as to cause the seat 4 at the upper end of the bolt slot to engage said conductor.

The advantages derived from the use of the improved means disclosed herein for retaining the nut and washer assembly B of the connector A in assembled relation relative to the bolt of the connector when said nut and washer assembly is dismounted from the connector bolt will be more fully appreciated when it is considered that connectors of the split bolt type are employed to a large extent on overhead lines, as for the purpose of connecting a tap conductor, such as the top conductor Cb, to a main or feeder line Ca. While located on a pole, or other support, a lineman customarily holds the tap conductor in one hand and manipulates the connector with the other hand until a preliminary connection is effected, a wrench or other suitable tool being thereafter applied to the connector to complete the connection. This operation is greatly simplified by the use of a connector constructed and arranged as described herein, since such connector is capable of being very conveniently hooked over a line and requires a simple, one-hand operation to apply the nut and washer assembly to the threaded shank of the connector bolt.

Another important advantage of the present invention is that the coil 11 of the nut retainer holds the nut and washer assembly in a fixed position when said nut and washer assembly is dismounted from the connector bolt, as is shown in Fig. 3, so that said nut and washer assembly may not move loosely about and perhaps interfere with the convenient application of the connector to an overhead line. This advantage arises from the fact that when the nut and washer assembly is unscrewed from the connector bolt and is moved downwardly relative to the nut retainer B, the coil 11 of said nut retainer is compressed between the fingers 10 of the washer 6, as is shown in Fig. 4, the tapered shape of said coil 11 facilitating disposition of said coil between said fingers and such compression of said coil. Thus, when the nut and washer assembly is disposed in the position relative to the connector bolt 1 in which it is shown in Fig. 3, the coil 11 of the nut retainer B is held under such compression between the fingers 10 of the washer that the tendency of the coil to expand will cause said coil to resiliently grip said fingers and thereby hold the entire nut and washer assembly in the proper position to facilitate application of the connector to a conductor.

I claim:

1. An electrical connector comprising a screw-threaded body member having laterally spaced shank portions, an assembly comprising a nut and a washer the nut of which is normally threaded on said body member, said washer being provided with non-resilient fingers which extend downwardly through the bore of the nut and project outwardly so as to underlie the bottom face of said nut, and said washer being provided with openings through which said spaced shank portions of said body member extend when the nut and washer assembly is mounted on said body member, and means providing a connection between said nut and washer assembly and said body member when the nut and washer assembly is dismounted from said body member, said means comprising an element formed of resilient material and having an integral stem portion which is secured to one of said spaced shank portions of said body member and which extends through one of said openings of said washer when the nut and washer assembly is dismounted from said body member, and said element including a coiled portion which is too large to pass through said opening of said washer through which said stem portion extends and which is engaged at its opposite ends and compressed by said fingers of said washer.

2. An electrical connector comprising a screw-threaded body member having laterally spaced shank portions, an assembly comprising a nut and a washer the nut of which is normally threaded on said body member, said washer being provided with non-resilient fingers with extend downwardly through the bore of the nut and project outwardly so as to underlie the bottom face of said nut, and said washer being provided with openings through which said spaced shank portions of said body member extend when the nut and washer assembly is mounted on said body member, and means providing a connection between said nut and washer assembly and said body member when the nut and washer assembly is dismounted from said body member, said means comprising an element formed of resilient material having an integral stem portion which is secured to one of said spaced shank portions of said body member and which extends through one of said openings of said washer when the nut and washer assembly is dismounted from said body member, and said element including a coiled portion which is too large to pass through said opening of said washer through which said stem portion extends and which is engaged at its opposite ends and compressed by said fingers of said washer, said coiled portion of said element being disposed with its major axis at an angle relative to the major axis of said body member.

3. An electrical connector comprising a screw-threaded body member having laterally spaced shank portions, an assembly comprising a nut and a washer the nut of which is normally threaded on said body member, said washer being provided with non-resilient fingers which extend downwardly through the bore of the nut and project outwardly so as to underlie the bottom face of said nut, and said washer being provided with openings through which said spaced shank portions of said body member extend when the nut and washer assembly is mounted on said body member, and means providing a connection between said nut and washer assembly and said body member when the nut and washer assembly is dismounted from said body member, said means comprising an element formed of resilient material and having an integral stem portion which is secured to one of said spaced shank portions of said body member and which extends through one of said openings of said washer when the nut and washer assembly is dismounted from said body member, and said element including a coiled portion which is too large to pass through said opening of said washer through which said stem portion extends and which is engaged at its opposite ends and compressed by said fingers of said washer, said coiled portion of said element being disposed with its major axis at an approximate right angle relative to the major axis of said body member.

4. An electrical connector comprising a screw-threaded body member having laterally spaced shank portions, an assembly comprising a nut and a washer the nut of which is normally threaded on said body member, said washer being provided with non-resilient fingers which extend downwardly through the bore of the nut and project outwardly so as to underlie the bottom face of said nut, and said washer being provided with openings through which said spaced shank portions of said body member extend when the nut and washer assembly is mounted on said body member, and means providing a connection between said nut and washer assembly and said body member when the nut and washer assembly is dismounted from said body member, said means comprising an element formed of resilient material and having an integral stem portion which is secured to one of said spaced shank portions of said body member and which extends through one of said openings of said washer when the nut and washer assembly is dismounted from said body member, and said element including a coiled portion which is too large to pass through said opening of said washer through which said stem portion extends and which is engaged at its opposite ends and compressed by said fingers of said washer, said coiled portion of said element being disposed with its major axis at an angle relative to the major axis of said body member, and said coiled portion being tapered so that it is of less length at its top than at the bottom thereof.

KENNETH R. RUNDE.

REFERENCES CITED

The following references are of record in the file of this patent:

UNITED STATES PATENTS

| Number | Name | Date |
|---|---|---|
| 1,573,096 | Schlaich | Feb. 16, 1926 |
| 2,108,856 | Heinrich | Feb. 22, 1938 |
| 2,129,086 | Fotsch | Sept. 3, 1938 |
| 2,200,448 | Holke | May 14, 1940 |